(12) United States Patent
Shevchenko

(10) Patent No.: US 8,051,943 B2
(45) Date of Patent: Nov. 8, 2011

(54) CAR STEERING WHEEL ELECTROMECHANICAL BOOSTER

(75) Inventor: Aleksandr F. Shevchenko, Novosibirsk (RU)

(73) Assignee: Otkritoe Aktsionernoe Obschestvo "Kaluzskiy Zavod Elektronnikh Izdeliy", Kaluga (RU)

( * ) Notice: Subject to any disclaimer, the term of this patent is extended or adjusted under 35 U.S.C. 154(b) by 515 days.

(21) Appl. No.: 11/990,631

(22) PCT Filed: Aug. 14, 2006

(86) PCT No.: PCT/RU2006/000429
§ 371 (c)(1),
(2), (4) Date: Mar. 5, 2009

(87) PCT Pub. No.: WO2007/024157
PCT Pub. Date: Mar. 1, 2007

(65) Prior Publication Data
US 2009/0321173 A1 Dec. 31, 2009

(30) Foreign Application Priority Data
Aug. 19, 2005 (RU) ................... 2005126251

(51) Int. Cl.
*B62D 5/04* (2006.01)
(52) U.S. Cl. ........................ 180/444; 180/443
(58) Field of Classification Search ............ 180/443, 180/444
See application file for complete search history.

(56) References Cited

U.S. PATENT DOCUMENTS

| | | | | |
|---|---|---|---|---|
| 4,629,024 A * | 12/1986 | Buike et al. | ................... | 180/444 |
| 6,123,167 A * | 9/2000 | Miller et al. | ................... | 180/444 |
| 6,729,433 B2 * | 5/2004 | Uryu et al. | ................... | 180/444 |
| 6,851,508 B2 * | 2/2005 | Fukuda et al. | ................... | 180/444 |
| 7,149,615 B2 * | 12/2006 | Ura | ................... | 701/41 |

(Continued)

FOREIGN PATENT DOCUMENTS

RU 2 158 692 11/2000

(Continued)

*Primary Examiner* — Joanne Silbermann
*Assistant Examiner* — Michael Stabley
(74) *Attorney, Agent, or Firm* — McDermott Will & Emery LLP

(57) ABSTRACT

The invention relates to car control means. The stator of an electric motor is provided with a magnet core comprising n pronounced poles and a rotor comprising n–2 poles embodied in the form of permanent magnets. The stator three-phase winding is provided with coils placed in the six equal alternating phase areas in such a way that one area is assigned to one pole and with several coils belonging to one phase in each phase area. The winding coils in the areas belonging to one phase are connected in a parallel aiding configuration. The steering wheel booster body is provided with input and output shafts which are interconnected with the aid of a torsion bar embodied in the form of a torque sensor sensing element and are linked with the sheering wheel and sheering mechanism by the other ends thereof. The electric motor rotor is mounted on the output shaft. The inventive device also comprises a controllable source for supplying the stator winding, a rotor position sensor and a control unit which is connected to the outputs of the torque and rotor position sensors by the inputs thereof and to the control input of the supply source by the output thereof. Said invention excludes the transmission of an outside disturbance torque to the steering wheel and makes it possible to improve the productability of the electric motor and the steering wheel buster and to increase the useful properties thereof.

4 Claims, 3 Drawing Sheets

U.S. PATENT DOCUMENTS

| | | | | |
|---|---|---|---|---|
| 7,219,761 | B2 * | 5/2007 | Fukuda et al. | 180/444 |
| 7,237,646 | B2 * | 7/2007 | Fukuda et al. | 180/444 |
| 7,325,646 | B2 * | 2/2008 | Asada | 180/444 |
| 7,392,879 | B2 * | 7/2008 | Imagawa et al. | 180/444 |
| 7,604,088 | B2 * | 10/2009 | Nishizaki et al. | 180/446 |
| 2003/0019686 | A1 * | 1/2003 | Fukuda et al. | 180/444 |
| 2003/0144780 | A1 * | 7/2003 | Recker et al. | 701/41 |
| 2004/0188170 | A1 * | 9/2004 | Asada | 180/443 |
| 2004/0245041 | A1 * | 12/2004 | Fukuda et al. | 180/444 |
| 2005/0016789 | A1 * | 1/2005 | Asada | 180/444 |
| 2005/0251311 | A1 * | 11/2005 | Burton et al. | 701/41 |
| 2007/0107974 | A1 * | 5/2007 | Ueno | 180/444 |
| 2008/0067960 | A1 * | 3/2008 | Maeda et al. | 318/400.02 |

FOREIGN PATENT DOCUMENTS

RU     2 181 091     4/2002

* cited by examiner

CAR STEERING WHEEL ELECTROMECHANICAL BOOSTER

RELATED APPLICATIONS

This application is the U.S. National Phase under 35 U.S.C. §371 of International Application No. PCT/RU2006/000429, filed on Aug. 14, 2006, which in turn claims the benefit of Russian Patent Application No. RU 2005126251, filed on Aug. 19, 2005, the disclosures of which Applications are incorporated by reference herein.

TECHNICAL FIELD

The declared invention relates to car driving means and may be used in order to accomplish a steering wheel force reduction, in particular, upon manipulations at small speeds and upon a turn of wheels when a car is in stationary state.

BACKGROUND OF THE INVENTION

There is known the car steering wheel electromechanical booster, comprising a steering wheel torque sensor, a car speed sensor, a control unit, connected to said sensors as well as an electric motor, which is controllable in response to signals from the control unit and which connected to an output shaft by means of speed reduction device (see the RU 2158692, Int. CL: B 62 D 5/04, 2000).

The electric motor in this device is a three-phase machine with a number of teeth on stator equal to 12, and on rotor, equal to 8, but a magnetic system of the electric motor is made with a relative slanting of rotor and stator teeth, therewith, a the crown slanting and width of the stator and rotor teeth with respect to an air gap are selected in determined correlations to a tooth pitch with respect to the rotor.

The known device drawbacks are as follows:
- an electromagnetic torque pulsation on a shaft;
- large dimensions and weight;
- the speed reduction device presence in the steering wheel booster, which complicates the construction;
- the weight and dimensions values are increased ones;
  - a car driving safety is impaired due to a possibility of steering wheel self-locking upon the steering wheel booster failure occurrence.

The closest analogue with respect to the declared steering wheel electromechanical booster is a steering wheel electromechanical booster, comprising a body, wherein there are positioned input and output shafts, which are interconnected with the aid of a torsion bar, which is embodied in the form of a torque sensor sensing element, and are linked with the steering wheel and a steering mechanism by the other end thereof, an electric motor, comprising a stator with a magnet core, having n pronounced poles, and with a three-phase winding, which is accomplishes with coils, that are placed in six equal alternating phase areas in such a way that one area is assigned to one pole and with several coils belonging to one phase in each phase area, and a rotor with n−2 poles, which are embodied in the form of permanent magnets, therewith, the rotor is mounted on the output shaft, a controllable source for supplying the stator three-phase winding of the electric motor, a sensor of the rotor position of the electric motor and a control unit, inputs of which are connected to the outputs of the torque sensor and the electric motor rotor position sensor, but the output of which is connected to the control input of said supplying source. (RU 2181091, Int. CL: B 62 D 5/04, 2002).

In the known device the coils of the electric motor stator three-phase winding in the phase areas, belonging to one phase, are connected in a series aiding configuration.

The known device drawbacks are as follows:
- a weak internal damping due to the absence of shock damper contours on the rotor and on the stator of the electric motor. It leads to a disturbance torque transfer onto the steering wheel upon an acute exposure to wheels on the part of roadway;
- a poor technological effectiveness of the electric motor stator manufacturing and the ins and the outs of an optimal mechanical characteristic obtainment.

The given drawbacks are conditioned in that upon low frequencies of supplying and upon low voltages the stator winding of the electric motor has a small number of phase coil turns and a large cross-section. It aggravates its laying into slot openings.

An electrical motor for a high-torque direct-drive electromechanical booster of steering wheel should have a maximal moment upon the given dimensions with maximal electromagnetic loads.

Upon the given dimensions of the electrical motor and upon the given magnetic induction a form of mechanical characteristic (i.e., points of nonworking stroke and short circuit) is determined by means of number of phase turns.

Upon a small number of phase turns, connected in series (it occurs in the known electrical booster of the steering wheel), the ins and the outs arise in an obtainment of the optimal mechanical characteristic due to a large discretisation of varying of the number of turns upon their selection.

DISCLOSURE OF THE INVENTION

A problem, to solving of which the present invention is directed, consists in a device creation, wherein there is excluded the transfer on the steering wheel a foreign disturbing moment and wherein there is improved a technological effectiveness of the electric motor stator manufacturing and of the steering wheel booster manufacturing in whole as well as there is improved their useful qualities.

In the claimed invention the technical result is obtained by means of creation of the steering wheel electromechanical booster, comprising a body, wherein there are positioned input and output shafts, which are interconnected with the aid of a torsion bar, which is embodied in the form of a torque sensor sensing element, and are linked with the steering wheel and a steering mechanism by the other end thereof, an electric motor, comprising a stator with a magnet core, having n pronounced poles, and with a three-phase winding, which is accomplished with coils, that are placed in six equal alternating phase areas in such a way, that one area is assigned to one pole, and with several coils, belonging to one phase in each phase area, and a rotor with n−2 poles, which are embodied in the form of permanent magnets, therewith, the rotor is mounted on the output shaft, a controllable source for supplying the stator three-phase winding of the electric motor, a sensor of the rotor position of the electric motor and a control unit, inputs of which are connected to the outputs of the torque sensor and the electric motor rotor position sensor, but the output of which is connected to the control input of said supplying source, and wherein in accordance with the present invention the coils of the electric motor stator three-phase winding in the phase areas, belonging to one phase, are connected in a parallel aiding configuration.

The parallel connection of the coils in the phase areas allows to form short-closed contours in the stator winding, therewith, in adjacent coils of electromotive force (EMF) is phase-shifted one. Upon disturbances, entered from the car wheels, the motor rotor, which is located on the output shaft, begins to work out these disturbances, whereby currents appear in the contours of the winding. A damping torque, which is created by these currents, kills the entered disturbances.

Thus, these contours are an analogue of damping grid in synchronous machines.

The usage the magnetic core of the electric motor as a steering wheel booster body allows to simplify the construction and technology of the steering wheel electromechanical booster manufacturing.

A positioning of the moment torsion-sensor inside of hollow output shaft or inside of hollow input shaft allows to reduce the steering wheel electromechanical booster dimensions.

The parallel connection of the coils leads to an increase of the turns in the coil. It, in turns, allows to fulfilling their number selection more optimally, and an electromagnetic moment is increased thereby.

DISCLOSURE OF GRAPHIC MATERIALS

The claimed invention essence is explained by means of following description and drawings, wherein:

FIG. 1 has shown the declared steering wheel electromechanical booster in section;

VARIANT OF THE BEST EMBODIMENT OF THE DECLARED INVENTION

Figure 1:
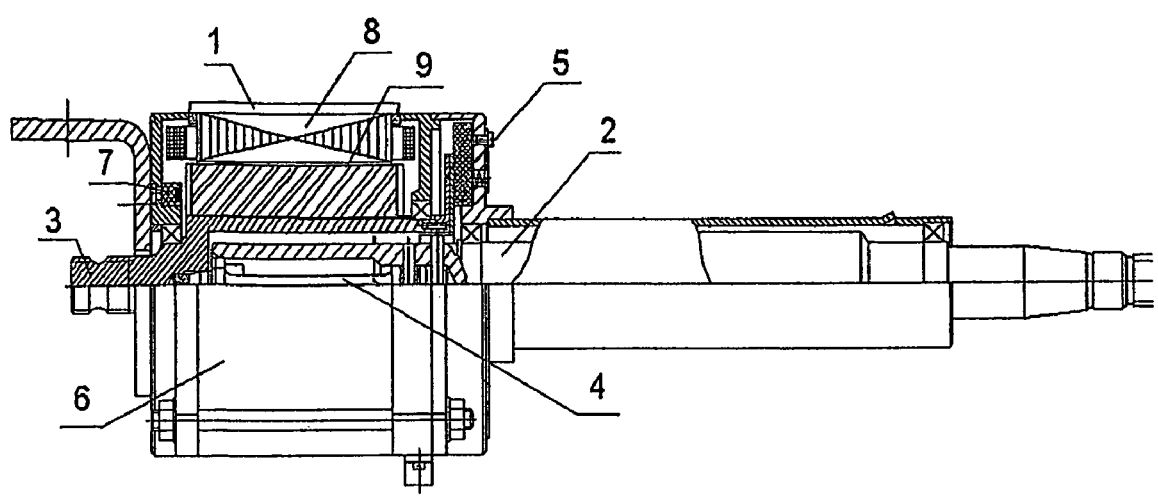
Figure 2:
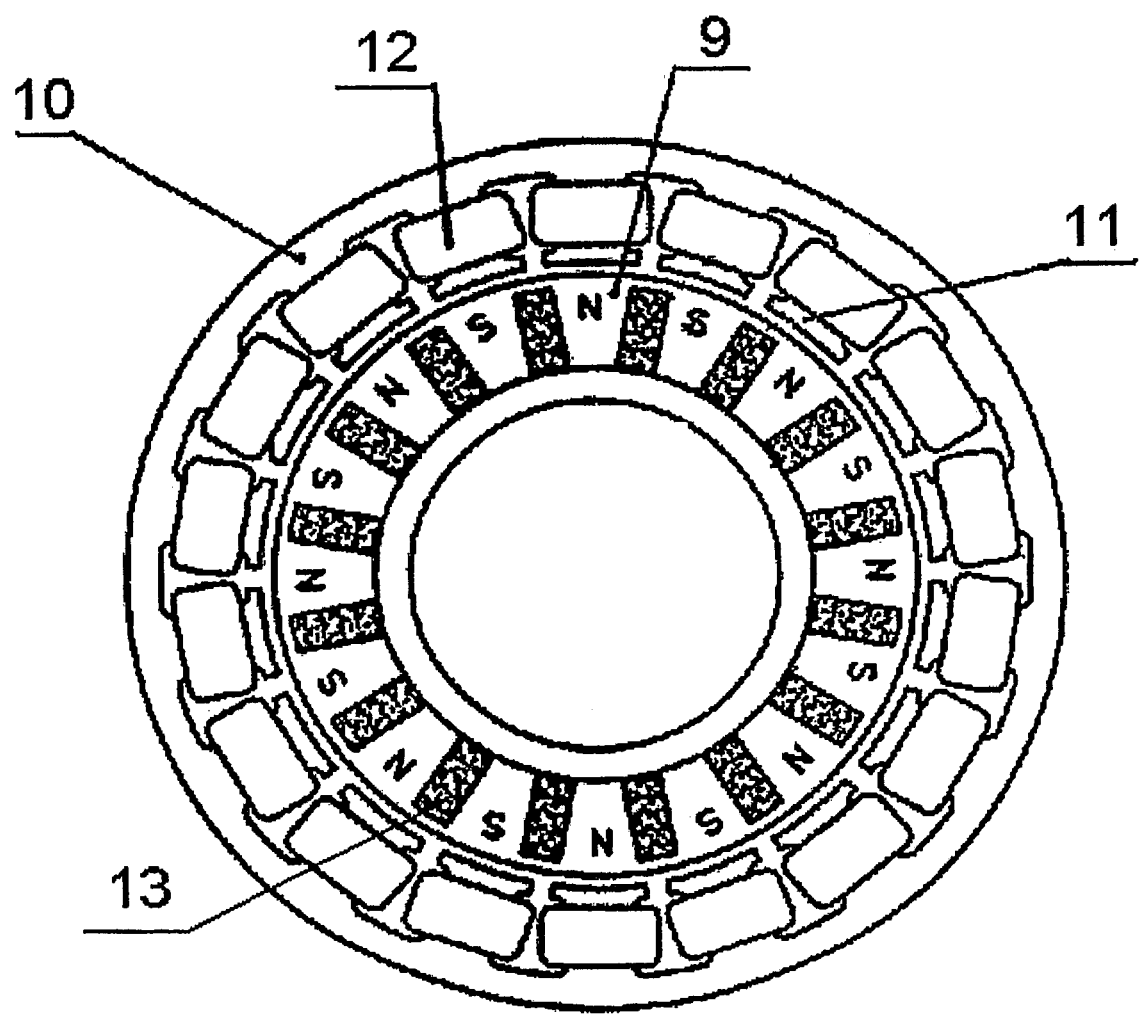
FIG. 2 is across-section of electric motor, which is used in the steering wheel electromechanical booster.
Figure 3:
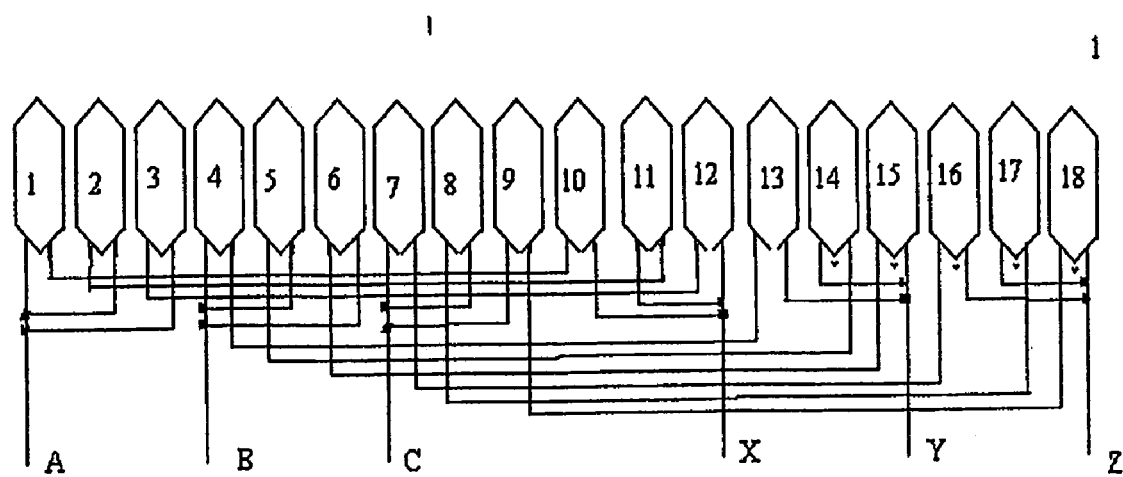
FIG. 3 is a schema of connection of the coil poles.

A car steering wheel electromechanical booster consists of a body 1, an input shaft 2 and output shaft 3, connected to one another by means of torsion 4, which is sensing element of moment sensor 5, measuring a moment, applied to the steering wheel, and forming corresponding output signals, an electric motor 6, a controllable source (not shown) for supplying the three-phase stator winding of the electric motor, a rotor position sensor 7 of the electric motor and a control unit (not shown).

The inputs of the control unit are connected to the outputs of the moment sensor 5 and of the rotor position sensor 7 of the electric motor, but the output is connected to the control input of said supplying source.

The electric motor 6 consists of stator with a magnet core 8 and a rotor 9, which is mounted on the output shaft 3 of the steering wheel booster.

The electric motor 6 is three-phase one. A stator 10 is made with pronounced poles 11, on which coils 12 are singly on one pole positioned.

The rotor 9 is multi-pole one and it is made with an energizing from permanent magnets 13. A number of the stator poles 11 differ from a number of the rotor poles by two.

The rotor position sensor 7 consists of three Hall sensors, which are shifted with respect to each other by 120 el. degrees and which fix the rotor angular position with respect to the rotor 9 leakage fluxes, which are created by the permanent magnets 13.

The stator 10 coils, having origins A, B and C and ends X, Y and Z, are positioned in six phase areas. In each phase area there are several coils, which are connected with parallel aiding configuration and which belong to one phase.

The stator magnet core 8 may be used as a body of the steering wheel booster (it may be brought in coincidence with the body 1). Such an accomplishment depends on technological possibilities upon a construction manufacturing.

The torsion 4 of the moment sensor 5 may be positioned inside of the hollow output shaft 3 or inside of the hollow input shaft 2.

Such a location of the torsion allows to carrying out a splined joint of the input shaft and the output shaft with a back play, which equals to value of the torsion wind-up angle.

It is necessary in order to provide a safety in case of applying to the input shaft an excessive moment, which is capable to break the torsion. A selection of one or another variant of the torsion positioning is determined by constructive peculiarities of the steering wheel electromechanical booster.

The declared steering wheel electromechanical booster operates as follows.

Upon an occurrence of signal on the moment sensor 5 the electrical motor 6 control unit generates a power controlling signal, which is applied to the electric motor 6 windings in order to create a required compensating moment on a steering mechanism. Therewith, a value of the signal on the winding 12 is formed taking into consideration the signals of the rotor position sensor 7.

In the control unit of the electric motor 6 in accordance with a setting signal there is formed a current of sinus form, which upon its passage in the stator 10 windings 12 creates an electromagnetic moment, which is applied immediately to the input shaft 3 of the steering wheel booster.

An application of the winding 12 with a connection of the coils in phase area in a parallel aiding configuration allows to simplify the technology of the electrical motor 6 manufacturing as well as to improve weight and dimensions values of the electrical motor 6 and of the steering wheel booster in whole by means of more exact selection of number of the phase turns.

In the declared invention upon the parallel connection of the coils and upon the winding connection to the same voltage, that is upon the connection in series, number or turns in the coil increases, but an area of wire cross section reduces. It is more technologically to lay the winding with a smaller cross section in the motor of the steering wheel electromechanical booster.

The weight and dimensional values of the motor are determined by value of the electromagnetic moment upon the given dimensions. The moment value is proportional one to a product of current rate, number of turns and induction in air gap.

Upon a selection of maximal induction value in the air gap and upon the given value of the maximal current rate, consumed from a vehicle-borne electric power line, an increase of the moment value may be obtained only by means of selection of the optimal number of turns in a phase. But the increase of the number of turns leads to an increase of counter-electromotive force of the winding and, therefore, to a reducing of current rate in the winding and to the moment reduction.

A point of nonworking stroke of the mechanical characteristic is also varies, a value of which is proportional to the value of applied voltage and is in inverse proportion with respect to the number of turns in the coil and to a magnetic flow.

Electric motors with coils, which are connected in series in phase areas, have a small number of turns in the coil, but therefore their number may be varied with a large discretization of 3, 4, 5 and so on.

For example, as a matter of principle it is technologically impossible to manufacture the winding with a number of turns in the coil, which is equal to 5.3 in the motor with three coils, connected in series in a phase area, but upon the parallel connection of three coils upon the same voltage the number of turns in the coil should be increased thrice, and it may be taken as 5.3×3≈16.

In the coils, which are connected parallel in a phase area, upon a rotation of the rotor 9 there are induces electromotive forces, which are various ones with respect to their value, and it leads to an appearance of equalizing current in the winding 12. For this reason in ordinary machines in principle such a connection is not used. Whereas the motor of the car steering wheel electromechanical booster operates upon extremely low frequencies of rotation (up to 2 revolutions per second).

Upon the mentioned low frequencies of rotation the electromotive force, which is induced in the windings, is not large one, and the equalizing current is small one upon nominal modes, since the applied voltage is essentially equalized by means of drop in voltage upon an active resistance of the winding 12 of the stator 10.

In transitional regimes upon the acute exposure to the rotor 9 shaft on the part of wheels instantaneous values of electromotive force in the coils acute increase, and it leads to an appearance of significant equalizing currents in the coils of phase areas, which create counteractive moments, promoting a damping of disturbances on the part of the wheels.

Thus, a connection of the coils of the stator 10 of the electric motor 6 in each phase area, belonging to one phase in a parallel aiding configuration, differs gainfully the declared invention from the closest analogues, since it allows to exclude the transfer on the steering wheel a foreign disturbing moment, essentially to improve a technological effectiveness of the electric motor stator manufacturing and of the steering wheel booster manufacturing in whole as well as to improve their useful qualities.

The usage of the claimed invention allows to improve a safety and a convenience upon a car driving.

INDUSTRIAL APPLICABILITY

There were made and tested specimens of the steering wheel electromechanical booster. The obtained results have shown, that in comparison with a prototype the maximal moment on the shaft of the declared steering wheel electromechanical booster is increased by 10% due to a possibility of more optimal selection of number of turns in the electric motor coils.

The invention claimed is:

1. A steering wheel electromechanical booster, comprising: a body, wherein there are positioned input and output shafts, which are interconnected with the aid of a torsion bar, which is embodied in the form of a torque sensor sensing element, and are linked with the steering wheel and a steering mechanism by the other end thereof, an electric motor, comprising a stator with a magnet core, having n pronounced poles, and with a three-phase winding, which is accomplished with coils, that are placed in six equal alternating phase areas in such a manner that one area is assigned to one pole, and with several coils, belonging to one phase in each phase area, and a rotor with n−2 poles, which are embodied in the form of permanent magnets, therewith, the rotor is mounted on the output shaft, a controllable source for supplying the stator three-phase winding of the electric motor, a rotor position sensor of the electric motor and a control unit, inputs of which are connected to the outputs of the torque sensor and the electric motor rotor position sensor, but the output of which is connected to the control input of said supplying source, wherein the coils of the electric motor stator three-phase winding in the phase areas, belonging to one phase, are connected in a parallel aiding configuration.

2. A steering wheel electromechanical booster as set forth in claim 1, wherein the electric motor stator magnetic core is used as a body of the steering wheel booster.

3. A steering wheel electromechanical booster as set forth in claim 1, wherein the moment sensor torsion is positioned inside of the hollow output shaft.

4. A steering wheel electromechanical booster as set forth in claim 1, wherein the moment sensor torsion is positioned inside of the hollow input shaft.

\* \* \* \* \*